United States Patent [19]
Barendregt

[11] Patent Number: 5,951,393
[45] Date of Patent: Sep. 14, 1999

[54] POULTRY BREAST FILLETING MANDREL

[75] Inventor: Gerrit Barendregt, Heinenoord, Netherlands

[73] Assignee: Systemate Holland, B.V., Numansdorp, Netherlands

[21] Appl. No.: 09/040,028

[22] Filed: Mar. 17, 1998

[51] Int. Cl.[6] .................................................. A22C 17/02
[52] U.S. Cl. .......................................... 452/165; 452/185
[58] Field of Search ..................................... 452/165, 185

[56] References Cited

U.S. PATENT DOCUMENTS

| | | | |
|---|---|---|---|
| 4,593,432 | 6/1986 | Hazenbroek . | |
| 4,682,386 | 7/1987 | Hazenbroek et al. . | |
| 4,780,930 | 11/1988 | Sparkia | 452/165 |
| 4,873,746 | 10/1989 | Scheier et al. . | |
| 5,045,022 | 9/1991 | Hazenbroek | 452/165 |
| 5,045,024 | 9/1991 | Diesing | 452/165 |
| 5,474,491 | 12/1995 | Koch | 452/165 |
| 5,697,837 | 12/1997 | Verrijp et al. | 452/165 |

*Primary Examiner*—Willis Little
*Attorney, Agent, or Firm*—Thomas, Kayden Horstemeyer & Risley

[57] ABSTRACT

A poultry breast filleting mandrel 10 for carrying an eviscerated poultry carcass along a processing path through a breast filleting process in which the meat of the poultry carcass is removed from the skeleton of the carcass, includes a base 12 for mounting to a conveyor, a shroud 14 removably mounted to the base for receiving thereabout the visceral cavity of the breast of a poultry carcass, and a movable clamp 46 for grasping the breast of a poultry carcass for holding the breast of the poultry carcass on the shroud. A shroud lock 112 is provided for locking the shroud to the base during processing and a shroud lock release 117 is provided for disengaging the shroud lock and allowing removal of the shroud for cleaning, repair, etc.

5 Claims, 2 Drawing Sheets

POULTRY BREAST FILLETING MANDREL

FIELD OF THE INVENTION

The invention relates to a method and apparatus for automatically separating the meat from the skeletal structure of the breast and adjacent back portions of a previously eviscerated poultry carcass. In particular, the invention relates to a mandrel for carrying the previously eviscerated poultry carcass along a processing path for processing.

BACKGROUND OF THE INVENTION

In the processing of edible poultry, such as chickens and turkeys, it is desirable to separate the meat from the skeletal structure of the poultry carcass so that the meat can be marketed separately, without the bone contained in the meat. The then all meat product can be attractively packaged and sold at the grocery store, and can be sold to restaurants where the meat can be cooked and served in sandwiches or served in relatively small portions which are easy to eat and without requiring the consumer to separate the meat from the bone.

In the past, the process of filleting poultry parts, such as thighs and breasts, has been achieved by hand, with workers manually stripping the meat from the bone. More recently, automated equipment has become available which functions to separate the meat from the skeletal part of the carcass, wherein the breast, usually with legs, wings and back cut away, is placed on a mandrel, and the mandrel moved along a processing path. The meat is gouged, scraped and cut away from the skeletal structure which is rigidly mounted to the mandrel, as the mandrel carries the skeletal structure along the processing path. This process is illustrated in U.S. Pat. No. 4,682,386.

Although automated equipment has been developed and successfully functions to debone the breast portion of the poultry carcass, there are times when the carcass becomes improperly aligned with the mandrel or dislodged from the mandrel, and the deboning process fails. Further, the prior art mandrels are mounted to a conveyor system and are somewhat difficult to remove from the conveyor system for cleaning, repair, etc.

Thus, there is a need for an improved mandrel for a skeletal deboning system for birds, wherein the mandrel reliably mounts the carcass of the bird in proper position, aligned with the cutting elements of the system, and then will function to release the skeletal portion of the carcass after the meat has been removed. Further, there is need for an improved mandrel that can be expediently removed from the conveyor system, cleaned, repaired or replaced, and remounted to the conveyor system.

SUMMARY OF THE INVENTION

Briefly described, the present invention comprises a poultry breast filleting system by which previously eviscerated poultry carcasses are automatically filleted, by mounting poultry carcasses with wings and legs removed, on a series of mandrels or carcass carriers, sometimes known as "cones", and moving the carcasses on the mandrels along a processing path where a series of implements engage and remove the meat from the skeletal structure of the carcass.

Each mandrel is of duplicate design and includes a leading portion that generally conforms to the shape of the eviscerated cavity of a bird, and following portions that support the skeletal structure at the proper breadth for urging the meat of the carcass outwardly and into the path of the cutting, gouging and scraping elements of the system. The mandrel is shaped so as to support the skeletal structure in a predetermined configuration so as to prevent the skeletal structure from collapsing as the carcass is processed.

As the carcass is moved by its mandrel along the processing path, the meat removing implements that engage the meat of the carcass tend to apply forces to the carcass that are directed toward the skeletal structure and along the surface of the skeletal structure, which tends to cause the skeletal structure to be supported by the mandrel, resulting in little if any damage to the skeletal structure during the meat removal process.

The mandrel is formed in two sections which can be easily disconnected from each other for the purposing of cleaning, repair, etc. The lower section, known as the carrier shoe, connects to the conveyor system and is moved along the processing path by the conveyor system. The shoe includes a rotary cam wheel which intermittently engages cam pins along the processing path, forcing the cam wheel to rotate and move its cam pin in a circular motion. A cam follower arm is pivotally connected intermediate its ends to the carrier shoe, with its lower end defining a slot that encompasses the cam pin, so that the cam arm oscillates in response to the rotation of the cam wheel.

The upper portion of the carrier shoe includes a clamp rod that has a rectilinear actuator arm that extends in the direction of movement of the carrier shoe, with the leading end of the actuator arm turned back on itself to form a nose clamp for engaging the skeletal structure of the breast of the bird carcass. The upper end of the cam follower arm engages the actuator arm and functions to reciprocate the actuator arm along its length, moving the nose clamp back and forth.

The mandrel shroud is movably connected to the carrier shoe, having its leading portion and upper trailing portions conforming generally to the shape of the interior surfaces of the visceral cavity of the breast of the bird, and dimensioned so as to urge the skeletal structure of the bird outwardly the distance necessary to place the meat of the skeletal structure in the path of the meat removing implements. The mandrel shroud covers and protects the cam follower arm and clamp rod, leaving only the nose clamp protruding from the leading end portion of the mandrel shroud. When the clamp rod reciprocates, its nose clamp is drawn toward or moved away from the mandrel shroud, so that the nose clamp tends to cooperate with the leading portion of the mandrel shroud to clamp the skeletal structure of the bird on the mandrel shroud.

The mandrel shroud can be manually slipped downwardly onto the carrier shoe, and a spring detent arrangement releasably connects the mandrel shroud to the carrier shoe. Thus, it is an object of this invention to provide an improved automated poultry breast filleting system wherein the previously eviscerated poultry carcasses with legs and wings removed, can be moved in series along a processing path and the meat can be progressively separated from the skeletal structure of the carcasses substantially without causing breakage of bones of the skeletal structure.

Another object of this invention is to provide a poultry carrier for carrying birds through a deboning process, which includes a carrier shoe that is mounted to a conveyor system, and a mandrel shroud which fits over the carrier shoe and is releasably connected to the carrier shoe, so that it can be expediently removed for cleaning, repair, etc., or firmly attached to the carrier shoe for the normal operation of meat recovery from the carcass.

Other objects, features and advantages of this invention will become apparent upon reading the following

DETAILED DESCRIPTION

Figure 1:
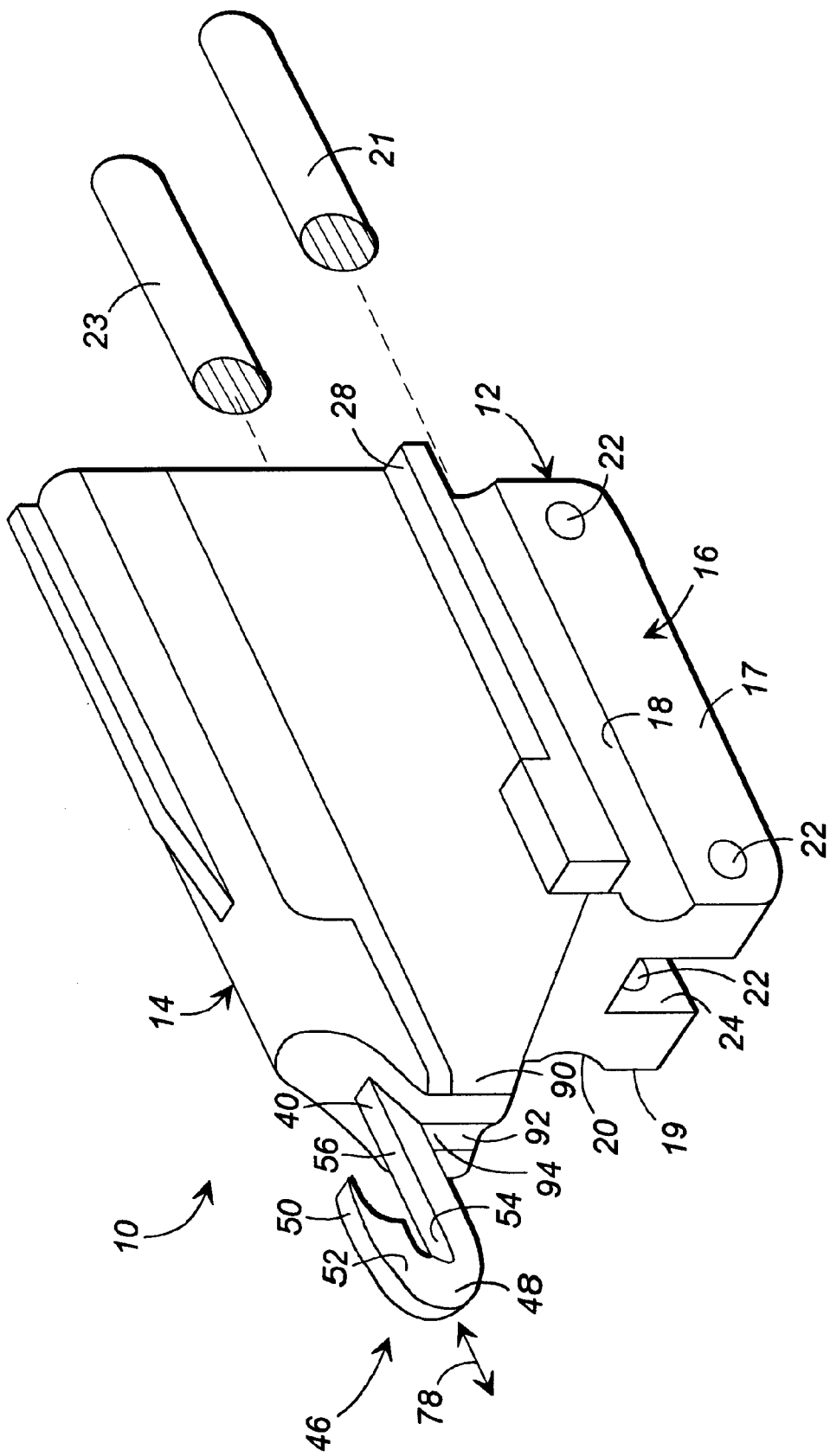
FIG. 1 is a perspective illustration of the carrier, showing the nose clamp extended from the shroud.

Referring now in more detail to the drawings in which like numerals indicate like parts throughout the several views, FIG. 1 shows the carrier 10 having its carrier shoe 12 and shroud 14 mounted on the shoe. The carrier shoe 12 includes a saddle-shaped base 16 that has opposed parallel lower side walls 17 and 19, each of which includes a rectilinear, horizontal recess 18 and 20. The recesses are parallel to each other, face outwardly and are sized so as to be engaged by parallel guide bars 21 and 23 that extend along the conveyor system which accurately guide the carrier shoe and stabilize the carrier shoe during the filleting function. The carrier shoe is mounted to a conveyor chain (not shown) by means of its aligned conveyor connector openings 22 extending through side walls 17 and 19, and a longitudinal slot 24 extends, from front to rear, along the bottom surface of the base 16, opening at the front, at the rear, and along the bottom surfaces of the base. A cam wheel 26 (FIG. 2) is mounted in slot 24, and is arranged to be engaged by laterally extending stationary pins 27 of the conveyor system, so that the cam wheel rotates in response to its movement along the conveyor line and the engagement of one of the pins. Carrier shoe 12 also includes upper support platform 28 that receives and supports shroud 14.

Figure 2:
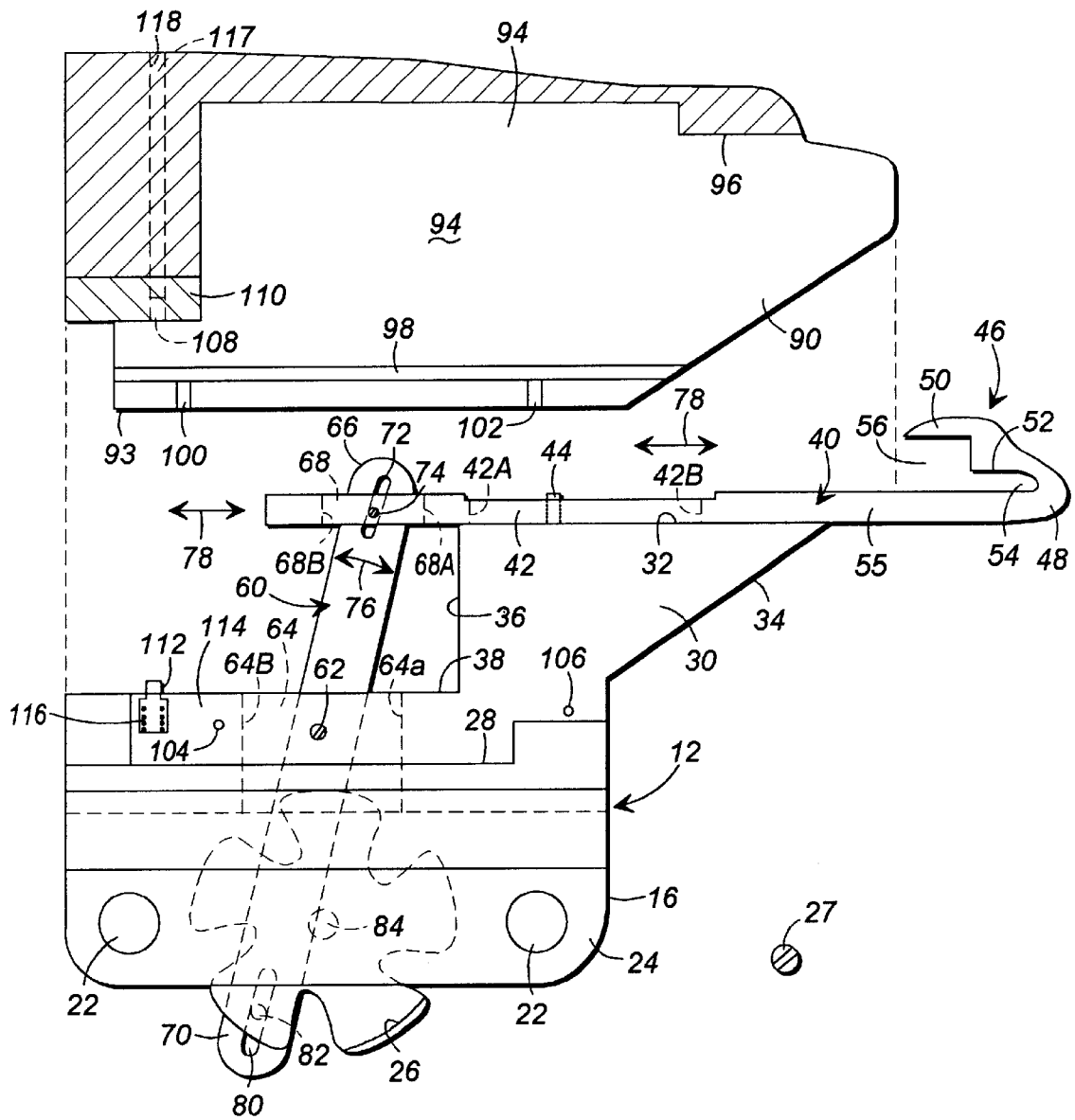
FIG. 2 is an exploded side view of the carrier shoe, showing the mandrel shroud above the mandrel shoe, with the mandrel shroud being shown in cross-section.

As illustrated in FIG. 2, carrier shoe 12 includes upright support plate 30 which is rigidly mounted to the base 16, and includes longitudinally extending slide surface 32, sloped undersurface 34, upright rear surface 36, and lower stepped surface 38. Rectilinear clamp rod 40, functioning as movable carcass clamp means, is slidably mounted on longitudinally extending slide surface 32. A slot 42 is formed intermediate the ends of clamp rod 40, and slidably receives locator pin 44. The ends of the slot 42 are indicated by the dash lines 42A and 42B. Nose clamp 46 is formed at the leading end of clamp rod 40, and the nose clamp is bent back along its length, to form the rounded nose 48, upper clamp protrusion 50 and stepped lower clamp protrusion 52. A lower slot 54 is formed between the main portion 55 of the clamp rod 40 and the stepped lower clamp protrusion 52, and a higher slot 56 is formed between upper clamp protrusion 50 and clamp rod 40.

Cam follower arm 60 is pivotally mounted between its ends by pivot pin 62 in internal cam follower arm slot 64, with its upper end 66 protruding through the clamp rod slot 68, and its lower end 70 protruding downwardly through internal cam follower arm slot 64 through the split cam wheel 26. The ends of internal cam follower slot 64 are indicated at 64A and 64B, and the ends of clamp rod slot 68 are indicated at 68A and 68B.

An elongated upper slot 72 is formed at the upper end of the cam follower arm 60 and clamp rod pin 74 extends through clamp rod 40 and slot 72, so as to move the clamp rod longitudinally along its length when the cam follower arm is oscillated about its pivot pin 62 as indicated by the double headed arrow 76. The longitudinal movement of the clamp rod 40 is indicated by the double headed arrow 78.

Likewise, lower slot 80 is formed in the lower portion of cam follower arm 60 and it surrounds cam pin 82 of the split cam wheel 26. Split cam wheel 26 comprises a pair of side-by-side duplicate wheels which straddle cam follower arm 60 and are rotatably mounted on concentric axles 84.

With this cam arrangement, when the cam wheel 26 engages an actuator pin 27 in the path of the mandrel, the wheel 26 rotates through a predetermined arc, thereby oscillating cam pin 82 about the axles 84 of the cam wheel. This oscillates cam follower arm 60, so as to move clamp rod along its length, as indicated by double headed arrow 78, thereby allowing the cam arrangement to function as clamp actuating means.

Shroud 14 includes a pair of side walls 90 and 92 that are parallel and form between them an internal vertical slot 94 which fits downwardly over and straddles clamp rod 40, cam follower arm 60 and upright support plate 30. The lower surfaces 93 of side walls 90 and 92 rest on upper support platforms 28 of carrier shoe 12. The slot 94 of the shroud is of enough height to accommodate the upper end 66 of the cam follower arm 60. The clamp rod 40 reciprocates adjacent the lower surface 96 of the upper portion of the shroud.

A pair of inwardly facing locking grooves 98 are formed on side walls 90 and 92, with the locking grooves 98 extending longitudinally of the structure, parallel to the bottom surface 93 of the shroud. Access slots 100 and 102 extend upwardly from bottom surface 93 of the shroud and intersect locking grooves 98. Access slots 100 and 102 are spaced apart a distance that corresponds to the spacing of locking pins 104 and 106 which protrude laterally on opposite sides of upright support plate 30 of carrier shoe 12.

Lock bore 108 is formed in internal metal block 110 that is rigidly attached to the rear of shroud 14 and faces downwardly. Similarly, a lock plunger 112 is captured by metal mounting block 114 of carrier shoe 12 and is biased by its spring 116 into a protruding or locked position as illustrated in FIG. 2.

When the shroud 14 is to be mounted on the carrier shoe 12, the internal vertical slot 94 of the shroud is slipped downwardly about clamp rod 40, upright support plate 30 and cam follower arm 60, until its vertical access slots 100 and 102 pass about lock pins 104 and 106, respectively, of carrier shoe 12, so that the lock pins 104 and 106 become registered with the horizontal locking grooves 98 of the carrier shoe. The shroud 14 is then slid rearwardly (to the left in FIG. 2) so that lock plunger 112 of carrier shoe 12 registers with lock bore 108 of shroud 14, with the lock plunger 112 and the lock bore 108 functioning as shroud locking means. This locks the shroud to the carrier shoe. Elongated disconnect pin 117, functioning as shroud lock release means, is reciprocally mounted in an upright, elongated hole 118 at the rear of the shroud 14, and the hole is aligned at it lower end with lock bore 108, so that the pin 116 can be urged downwardly through the lock bore 108 into engagement with the lock plunger 112, to depress the lock plunger and move it out of the lock bore 108. This permits shroud 14 to move longitudinally with respect to carrier shoe 12, so that the access slots 100 and 102 of the shroud can register with lock pins 104 and 106, respectively, allowing the shroud to be lifted off the carrier shoe 12.

Although a preferred embodiment of the invention has been disclosed in detail herein, it will be obvious to those skilled in the art that variations and modifications of the disclosed embodiment can be made without departing from the spirit and scope of the invention as set forth in the following claims.

What is claimed is:

1. A poultry breast filleting mandrel for carrying an eviscerated poultry carcass along a conveyor processing path through a breast filleting process in which the meat of the poultry carcass is removed from the skeleton of the carcass, said mandrel, comprising:

a base for mounting to a conveyor;

a shroud removably mounted to said base and adapted and arranged to receive thereabout the visceral cavity of the breast of a poultry carcass;

movable carcass clamp means mounted to said base, said movable carcass clamp means including a cam wheel rotatably supported by said base, a rectilinear clamp rod extending horizontally through said base and having at one end a U-shaped nose clamp protruding from said base with an upper clamp protrusion extending toward said shroud arranged for grasping the breast of a poultry carcass for holding the breast of a poultry carcass on said shroud, and an upwardly extending cam follower arm pivotally connected intermediate its ends to said base, with one end thereof pivotally connected to said clamp rod and the other end thereof pivotally connected to said cam wheel, whereby rotation of said cam wheel in response to the engagement by the cam wheel with a stationary cam reciprocates said rectilinear clamp rod along its length to move the nose clamp toward and away from engagement with a poultry carcass mounted on the shroud.

2. The mandrel of claim 1, and further including:

a shroud locking means including a lock plunger mounted to said base, said lock plunger biased to a locked position such that a portion of said lock plunger protrudes from said base when in said locked position; and a lock bore formed within said shroud for operatively engaging said portion of said lock plunger such that when said portion of said lock plunger operatively engages said lock bore said shroud is locked to said base.

3. The mandrel of claim 2, and further including:

a lock release means including a disconnect pin reciprocally mounted to said shroud, said disconnect pin adapted and arranged to engage said locking plunger such that said disconnect pin can be urged to displace said locking plunger from said lock bore so that the shroud can be removed from the base.

4. The mandrel of claim 3, further comprising retaining pins mounted to said base, said retaining pins adapted and arranged such that said retaining pins extend outwardly from opposing sides of said base; and retaining grooves formed in said shroud for operatively engaging said retaining pins such that said shroud is slidably mountable on said base when said grooves engage said pins.

5. A poultry breast filleting mandrel for carrying an eviscerated poultry carcass along a conveyor processing path through a breast filleting process in which the meat of the poultry carcass is removed from the skeleton of the carcass, said mandrel, comprising:

a base for mounting to a conveyor;

a shroud removably mounted to said base, said shroud adapted and arranged to receive thereabout the visceral cavity of the breast of a poultry carcass;

carcass clamp means mounted to said base, said carcass clamp means comprising a horizontally extending rectilinear clamp rod slidable along its length with respect to said base and having a U-shaped nose clamp protruding from said base defining an open slot facing said shroud and sized and shaped to engage about a portion of the breast of a poultry carcass mounted on said shroud for holding the breast of a poultry carcass on said shroud;

a cam wheel rotatable supported on said base; and a cam follower arm pivotally mounted to said base and extending between said cam wheel and said rectilinear cam rod for reciprocating said cam rod along its length to move said nose clamp toward and away from engagement with a breast of a poultry carcass mounted on said shroud.

* * * * *